United States Patent
Rabiei et al.

(10) Patent No.: US 8,650,883 B2
(45) Date of Patent: Feb. 18, 2014

(54) SYSTEM AND METHOD FOR OPERATING A GAS TURBINE

(75) Inventors: Shahryar Rabiei, Greenville, SC (US); Gilbert Otto Kraemer, Greer, SC (US); Geoffrey David Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 861 days.

(21) Appl. No.: 12/854,361

(22) Filed: Aug. 11, 2010

(65) Prior Publication Data

US 2012/0036862 A1 Feb. 16, 2012

(51) Int. Cl.
*F02C 9/20* (2006.01)
*G01J 5/10* (2006.01)

(52) U.S. Cl.
USPC .............. 60/773; 374/2; 374/121; 374/132; 250/339.03; 250/339.04

(58) Field of Classification Search
USPC ........ 60/773, 752; 374/2, 121, 124, 131, 132; 250/338.1, 339.03, 339.04; 415/118
See application file for complete search history.

(56) References Cited

U.S. PATENT DOCUMENTS

| | | | |
|---|---|---|---|
| 3,899,878 A * | 8/1975 | Compton et al. | 60/39.281 |
| 4,455,487 A | 6/1984 | Wendt | |
| 4,666,297 A * | 5/1987 | Suarez-Gonzalez | 356/45 |
| 5,252,860 A * | 10/1993 | McCarty et al. | 290/40 R |
| 5,257,496 A * | 11/1993 | Brown et al. | 60/773 |
| 5,421,652 A * | 6/1995 | Kast et al. | 374/208 |
| 5,544,478 A * | 8/1996 | Shu et al. | 60/773 |
| 5,584,171 A * | 12/1996 | Sato et al. | 60/773 |
| 6,071,114 A * | 6/2000 | Cusack et al. | 431/79 |
| 6,135,760 A * | 10/2000 | Cusack et al. | 431/79 |
| 6,422,745 B1 | 7/2002 | Glasheen et al. | |
| 6,579,005 B2 * | 6/2003 | Ingallinera | 374/45 |
| 6,775,645 B2 * | 8/2004 | Daw et al. | 702/188 |
| 6,775,986 B2 * | 8/2004 | Ganz et al. | 60/773 |
| 6,796,709 B2 | 9/2004 | Choi | |
| 7,305,118 B2 * | 12/2007 | Leboeuf et al. | 382/152 |
| 7,332,716 B2 * | 2/2008 | Hamrelius et al. | 250/332 |
| 7,632,012 B2 * | 12/2009 | Twerdochlib | 374/129 |
| 8,158,428 B1 * | 4/2012 | Krishna et al. | 436/5 |
| 8,167,483 B2 * | 5/2012 | Jensen | 374/120 |
| 8,192,077 B2 * | 6/2012 | Twerdochlib | 374/129 |
| 8,297,060 B2 * | 10/2012 | Myhre | 60/773 |
| 2004/0191914 A1 | 9/2004 | Widmer et al. | |
| 2006/0088793 A1 | 4/2006 | Brummel et al. | |
| 2008/0107150 A1 * | 5/2008 | Brummel et al. | 374/119 |

\* cited by examiner

*Primary Examiner* — Phutthiwat Wongwian
*Assistant Examiner* — Michael B Mantyla
(74) *Attorney, Agent, or Firm* — Dority & Manning, PA

(57) ABSTRACT

A system for operating a gas turbine includes a compressor, a combustor, and a turbine. The combustor and turbine define a hot gas path. A sensor disposed outside the hot gas path measures internal thermal emissions from the combustor or turbine and generates a first signal reflective of the internal thermal emissions. The internal thermal emissions are infrared or ultraviolet emissions. A controller connected to the sensor receives the first signal and adjusts the compressor, combustor, or turbine in response to the first signal from the sensor. A method for operating a gas turbine includes measuring internal thermal emissions from inside a combustor or turbine using a sensor disposed outside the hot gas path. The method further includes generating a first signal reflective of the internal thermal emissions and adjusting the operation of the compressor, combustor, or turbine in response to the first signal from the sensor.

15 Claims, 5 Drawing Sheets

SYSTEM AND METHOD FOR OPERATING A GAS TURBINE

FIELD OF THE INVENTION

The present invention relates generally to a system and method for operating a gas turbine. Specifically, embodiments of the present invention monitor internal and/or external thermal emissions of the combustor and/or turbine to adjust the operation of the gas turbine.

BACKGROUND OF THE INVENTION

Gas turbines are widely used in industrial and power generation operations. A typical gas turbine includes an axial compressor at the front, one or more combustors around the middle, and a turbine at the rear. Ambient air enters the compressor, and rotating blades and stationary vanes in the compressor progressively impart kinetic energy to the working fluid (air) to bring it to a highly energized state. The working fluid exits the compressor and flows to the combustors where it mixes with fuel and ignites to generate combustion gases having a high temperature, pressure, and velocity. The combustion gases flow from the combustors through the turbine along a hot gas path. In the turbine, the combustion gases expand to produce work. For example, expansion of the combustion gases in the turbine may rotate a shaft connected to a generator to produce electricity.

It is widely known that the thermodynamic efficiency of a gas turbine increases as the operating temperature, namely the combustion gas temperature, increases. Higher temperature combustion gases contain more energy and produce more work as the combustion gases expand in the turbine. However, higher temperature combustion gases may produce excessive temperatures in the combustor or turbine that can approach or exceed the life limiting temperature of various components along the hot gas path. In addition, changes in operating conditions, such as a change in the ambient temperature, fuel composition, and/or operating level of the gas turbine, may lead to excessive temperatures that may damage various components. As a result, industrial and power generation gas turbines often include control systems that monitor and control the operation of the gas turbines. For example, the control system may monitor various temperatures in the compressor, combustors, or turbine and adjust the operation of one or more components to achieve a desired operating parameter for the gas turbine and/or ensure that various operating limits are not exceeded.

The control system may use multiple sensors installed at multiple locations to fully monitor various parameters of the gas turbine. For example, cameras, gas analyzers, thermocouples, and other sensors known in the art may be installed to monitor conditions in the combustor, in the turbine, or along the hot gas path. The high temperature and pressure conditions in the combustors, turbine, and hot gas path, however, create a hostile environment for the sensors that adversely affects the sensitivity, accuracy, longevity, and overall performance of the sensors. Therefore, a control system that can monitor parameters inside the combustor, turbine, and/or hot gas path without requiring a sensor to be installed inside these components or locations would be desirable.

BRIEF DESCRIPTION OF THE INVENTION

Aspects and advantages of the invention are set forth below in the following description, or may be obvious from the description, or may be learned through practice of the invention.

One embodiment of the present invention is a system for operating a gas turbine. The system includes a compressor, a combustor downstream of the compressor, and a turbine downstream of the combustor. The combustor and turbine define a hot gas path. A sensor disposed outside the hot gas path measures internal thermal emissions from inside at least one of the combustor or turbine and generates a first signal reflective of the internal thermal emissions. The internal thermal emissions comprise at least one of infrared or ultraviolet emissions. A controller connected to the sensor receives the first signal and adjusts at least one of the compressor, combustor, or turbine in response to the first signal from the sensor.

In another embodiment, a system for operating a gas turbine includes a compressor, a combustor downstream of the compressor, and a turbine downstream of the combustor. The combustor and turbine define a hot gas path. A sensor disposed outside the hot gas path measures internal thermal emissions from inside at least one of the combustor or turbine and generates a first signal reflective of the internal thermal emissions. The sensor also measures external thermal emissions from outside at least one of the combustor or turbine and generates a second signal reflective of the external thermal emissions. The internal and external thermal emissions comprise at least one of infrared or ultraviolet emissions. A controller connected to the sensor receives the first and second signals and adjusts at least one of the compressor, combustor, or turbine in response to at least one of the first or second signals from the sensor.

Another embodiment of the present invention is a method for operating a gas turbine having a compressor, a combustor, and a turbine, wherein the combustor and turbine define a hot gas path. The method includes measuring internal thermal emissions from inside at least one of the combustor or turbine using a sensor disposed outside of the hot gas path, wherein the internal thermal emissions comprise at least a one of infrared or ultraviolet emissions. The method further includes generating a first signal reflective of the internal thermal emissions and adjusting the operation of at least one of the compressor, combustor, or turbine in response to the first signal from the sensor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
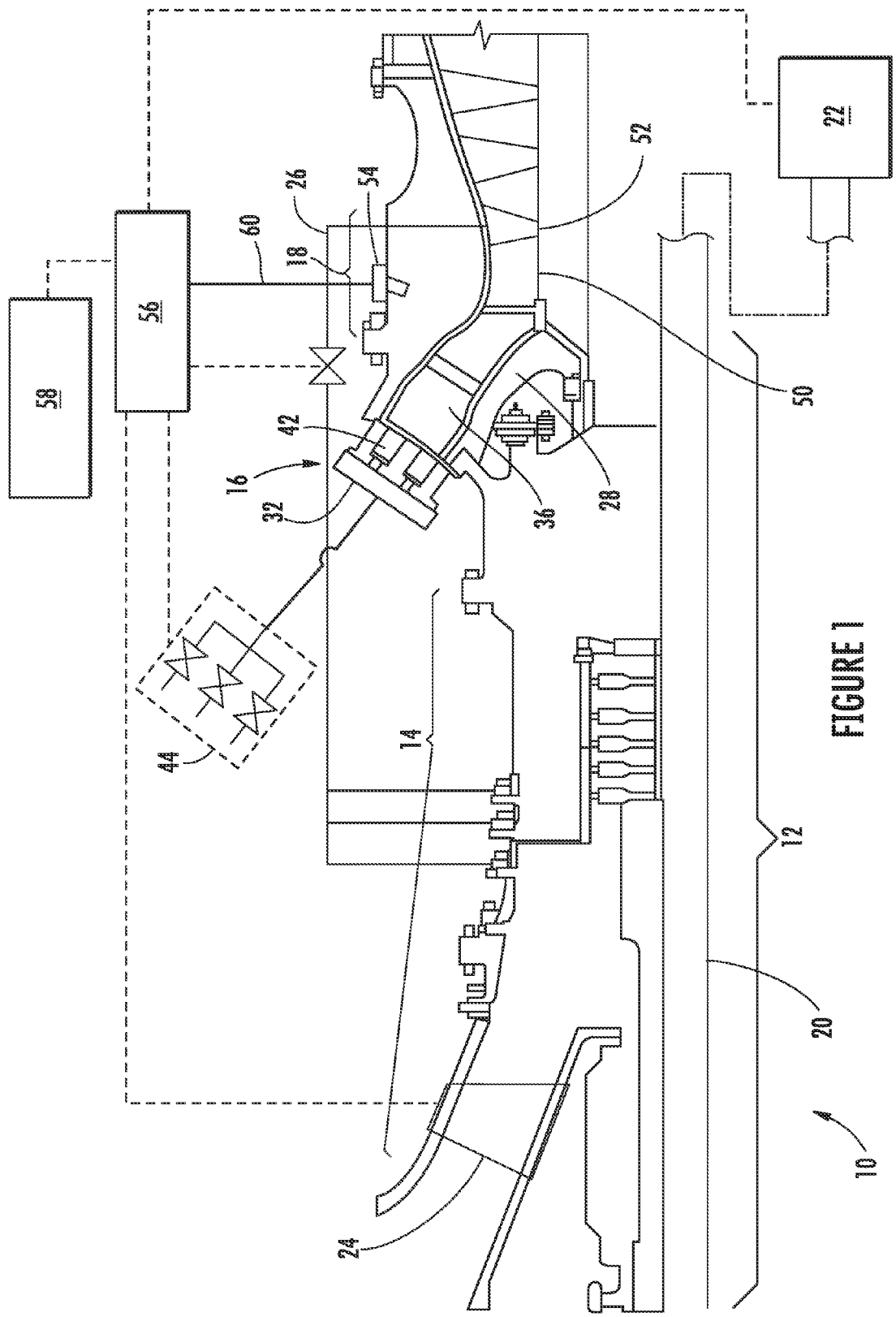
FIG. 1 is a simplified cross-section of a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

FIG. 1 shows a simplified cross-section of a system 10 according to one embodiment of the present invention. As shown, the system 10 generally includes a gas turbine 12 having a compressor 14 at the front, one or more combustors 16 radially disposed around the middle, and a turbine 18 at the rear. The compressor 14 and the turbine 18 typically share a common rotor 20 connected to a generator 22 to produce electricity.

The compressor 14 may comprise an axial flow compressor in which a working fluid, such as ambient air, enters through an inlet guide vane 24 and passes through multiple stages of aerofoils (not shown). The inlet guide vane 24 may have adjustable positions to regulate or adjust the amount of working fluid admitted into the compressor 14, depending on the operating level of the gas turbine 12. The multiple stages of aerofoils accelerate and redirect the working fluid to produce a continuous flow of compressed working fluid. A portion of the compressed working fluid may be diverted around the combustors 16 through a bypass connection 26 to provide cooling to the turbine 18, and the remainder of the compressed working fluid exits the compressor 14 and flows through a compressor discharge plenum 28 to the combustor 16.

Figure 2:
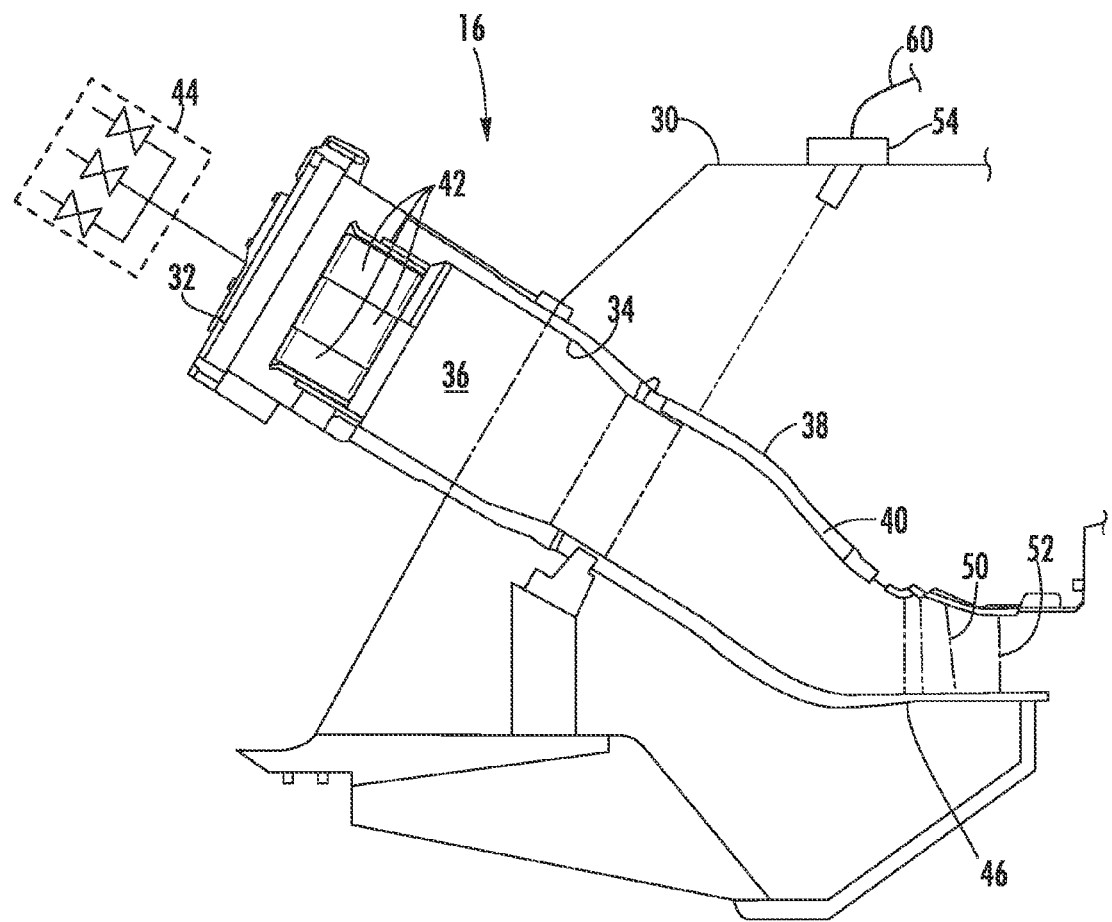
FIG. 2 is a simplified cross-section of a combustor according to one embodiment of the present invention.
Figure 3:
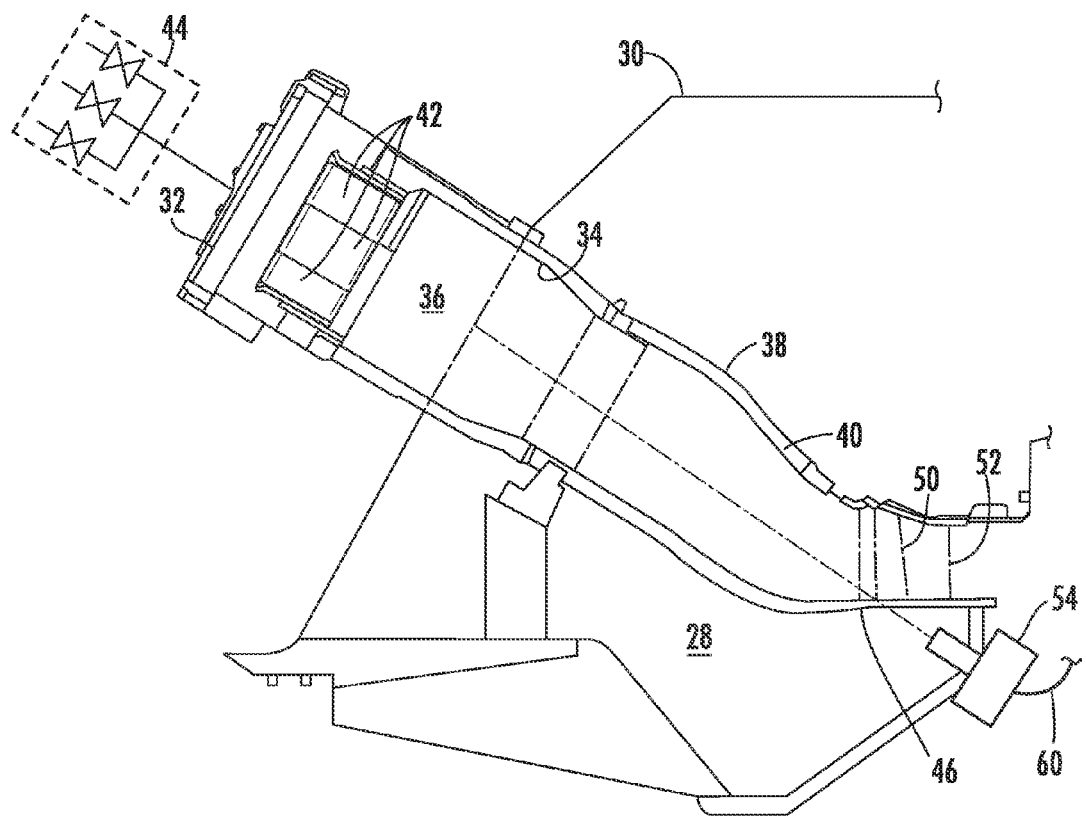
FIG. 3 is a simplified cross-section of a combustor according to a second embodiment of the present invention.
Figure 4:
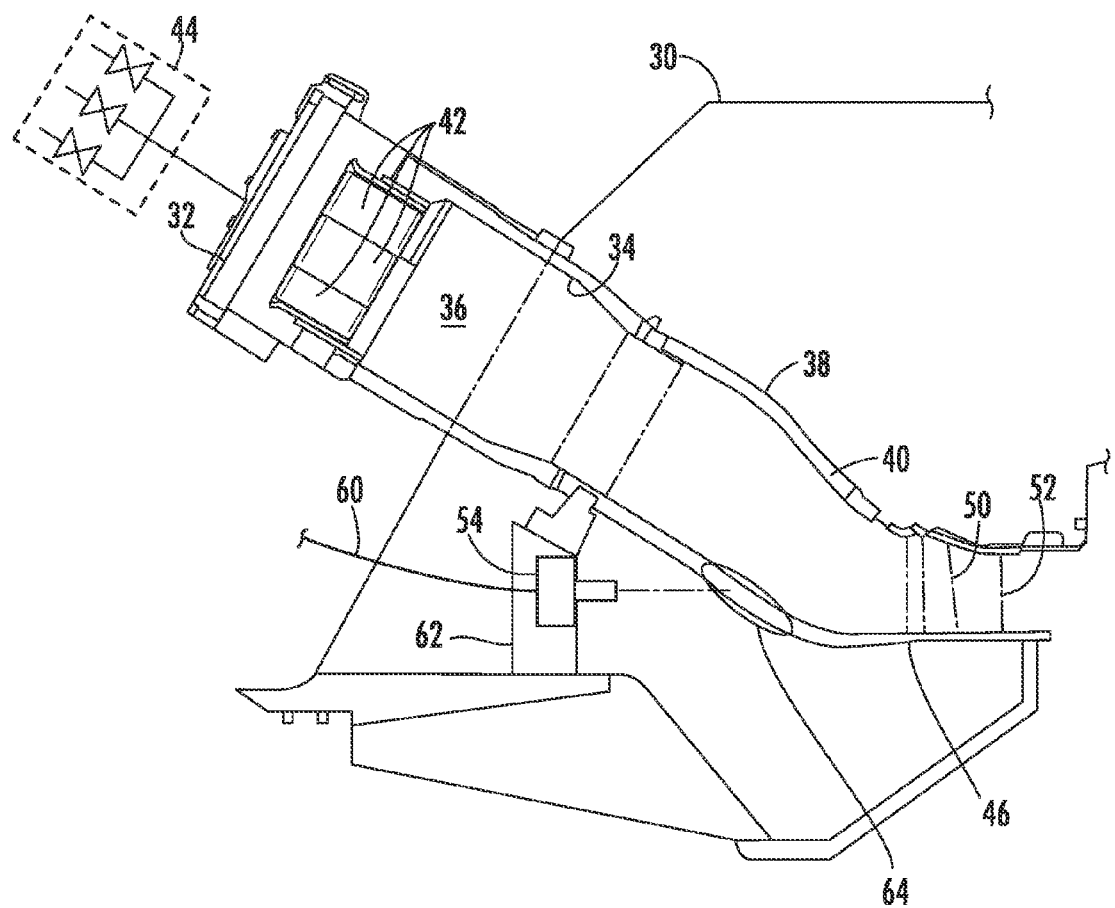
FIG. 4 is a simplified cross-section of a combustor according to a third embodiment of the present invention.

The combustor 16 may comprise any type of combustor known in the art. For example, as shown in FIGS. 2, 3, and 4, a casing 30 may surround the combustor 16 to contain the compressed working fluid exiting the compressor 14. An end cap 32 and a liner 34 may define a combustion chamber 36, and a flow sleeve 38 may surround the liner 34 to define an annular passage 40 between the flow sleeve 38 and the liner 34. The compressed working fluid may flow from the discharge plenum 28 through the annular passage 40 toward the end cap 32 where it reverses direction to flow through nozzles 42 and into the combustion chamber 36. A variable fuel supply 44 may provide a fuel mixture to the nozzles 42 so the nozzles 42 may mix the fuel mixture with the compressed working fluid prior to combustion. Possible fuels include one or more of blast furnace gas, coke oven gas, natural gas, vaporized liquefied natural gas (LNG), hydrogen, and propane. The mixture of fuel and working fluid flows to the combustion chamber 36 where it ignites to generate combustion gases having a high temperature and pressure. The combustion gases flow through a transition piece 46 to the turbine 18 where they expand to produce work.

Referring back to FIG. 1, the turbine 18 may include alternating rows of stators 50 and rotating turbine buckets 52. The first stage stator 50 redirects and focuses the combustion gases onto the first stage turbine bucket 52. As the combustion gases pass over the first stage turbine bucket 52, the combustion gases expand, causing the turbine bucket 52 and rotor 20 to rotate. The combustion gases then flow to the next stage stator 50 which redirects the combustion gases to the next row of rotating turbine buckets 52, and the process repeats for the following stages.

The combustors 16 and turbine 18 thus combine to define a hot gas path for the flow of combustion gases from the combustors 16 through the turbine 18. As used in this disclosure, the hot gas path is defined as the path that the combustion gases take as they flow from the combustion chamber 36 through the turbine 18. As the combustion gases flow through the hot gas path, the combustion gases heat up various components through convective and conductive heating. Depending on various factors, such as ambient temperatures, the operating level of the gas turbine 12, the fuel being used, and so forth, the components inside and outside of the hot gas path will produce thermal emissions in the infrared and/or ultraviolet spectrum.

As shown in FIG. 1, the system 10 may further include a sensor 54, a controller 56, and a communications device 58. The sensor 54 may comprise an infrared and/or ultraviolet detector disposed outside of the hot gas path. In this manner, the sensor 54 may produce one or more signals 60 reflective of thermal emissions from inside and/or outside of the hot gas path without requiring a penetration or hole into the hot gas path. For example, the sensor 54 may generate a first signal reflective of the thermal emissions from inside the hot gas path and a second signal reflective of the thermal emissions from outside the hot gas path.

The controller 54 may include various components such as microprocessors, coprocessors, and/or memory/media elements that store data, store software instructions, and/or execute software instructions. The various memory/media elements may be one or more varieties of computer readable media, such as, but not limited to, any combination of volatile memory (e.g., RAM, DRAM, SRAM, etc.), non-volatile memory (e.g., flash drives, hard drives, magnetic tapes, CD-ROM, DVD-ROM, etc.), and/or other memory devices (e.g., diskettes, magnetic based storage media, optical storage media, etc.). One of ordinary skill in the art will thus readily appreciate that the controller 54 may comprise any possible variations of data storage and processor configurations.

The controller 56 is connected to the sensor 54 to receive the one or more signals 60 from the sensor 54 reflective of thermal emissions from inside and/or outside of the hot gas path. The controller 56 may then adjust one or more components in the compressor 14, combustor 16, and/or turbine 18 in response to the signal 60 from the sensor 54 to achieve a desired temperature or temperature profile in the gas turbine 12. For example, as shown by the dashed lines in FIG. 1, the controller 56 may adjust the position of the inlet guide vane 24 or the variable fuel supply 44 to change the fuel-to-air ratio and thus the temperature of the combustion gases. Similarly, the controller 56 may adjust the amount of compressed working fluid flowing through the bypass connection 26 to change the amount of cooling provided to the turbine 18, or the controller 56 may adjust the load on the generator 22 in response to the signal 60 from the sensor 54.

In addition or alternatively, the controller 56 may actuate the communications device 58 in response to the signal 60 from the sensor 54. The communications device 58 may comprise any device known in the art for recording and/or conveying information. For example, the communications device 58 may include an alarm circuit, a printer, a recording system, or an announcing circuit. Operators may respond to the communications device 58, depending on the actual condition detected by the sensor 54. For example, operators may take manual control of the gas turbine 12 to alleviate an alarming condition that cannot be adequately controlled by the controller 56. As another example, operators may alter preventive or corrective maintenance schedules in response to the information conveyed by the communications device 58.

FIG. 2 illustrates one possible installation of the sensor 54 according to one embodiment of the present invention. As shown, the sensor 54 may be installed in the casing 30 and pointed in the general direction of the combustion chamber 36. Inasmuch as the liner 34 and the flow sleeve 38 are generally transparent to infrared and ultraviolet emissions, the sensor 56 may thus detect and measure thermal emissions from both inside and outside of the hot gas path. For example, the sensor 54 may detect and measure the temperature of the combustion gases and/or inner surface of the liner 34 inside the hot gas path. This may allow the system 10 to monitor the overall health of the combustor 16 and provide early detection of degraded thermal barrier coatings on the liner 34 or inadequate mixing of fuel and air in the nozzles 42 which could produce hot streaks or molten metal deposition in the liner 34. In addition or alternatively, the sensor 54 may detect and measure the temperature of the compressed working fluid flowing through the annular passage 40 and/or the outer surface of the flow sleeve 38 outside the hot gas path. The controller 56 may then adjust the position of the inlet guide vane 24 or the variable fuel supply 44 in response to the signal 60 from the sensor 54 to achieve a desired combustor discharge temperature, liner temperature, etc. In addition or alternatively, the controller 56 may actuate the communications device 58 to alert operators to an excessive temperature or unusual trend in temperatures detected by the sensor 54.

FIG. 3 illustrates another possible installation of the sensor 54 according to a second embodiment of the present invention. In this embodiment, the sensor 54 may be installed in the compressor discharge plenum 28 and pointed in the general direction of the end cap 32 and nozzles 42. In this manner, the sensor 54 may detect and measure the temperature of the end cap 32, each nozzle 42, and/or the inner surface of the liner 34 inside the hot gas path to detect, for example, a flame holding event or inadequate mixing of fuel and air in the nozzles 42, as previously discussed. As before, the controller 56 may then adjust the position of the inlet guide vane 24 and/or the variable fuel supply 44 to adjust the fuel-to-air mixture in the nozzle 42 and achieve the desired temperature profile in the nozzles 42 for the given operating level.

FIG. 4 illustrates another possible installation of the sensor 54 according to a third embodiment of the present invention. As shown, the sensor 54 may be installed in a support structure 62 for the combustor 16 and pointed in the general direction of the transition piece 46 and first stage stator 50 in the turbine 18. As shown in FIG. 4, a viewing port 64 may be installed between the sensor 54 and the hot gas path to increase the sensitivity and/or accuracy of the sensor 54. The viewing port may be constructed from suitable materials that can withstand the temperature and pressure of the combustor 16 while still allowing for the increased transmission of infrared and ultraviolet emissions to the sensor 54. For example, the viewing port may be constructed from glass, fiberglass, or similar temper resistant materials. In this manner, the sensor 54 may detect and measure the temperature of the inner surface of the transition piece 46 and/or the first stage stator 50 inside the hot gas path. This may allow the controller to adjust various operating parameters of the gas turbine 12 based on the first stage stator 50 temperature in lieu of or in addition to exhaust gas temperature. The controller 56 may then adjust the cooling provided to the stator 50 through the bypass connection 26 from the compressor 14 to achieve a desired temperature profile.

Figure 5:
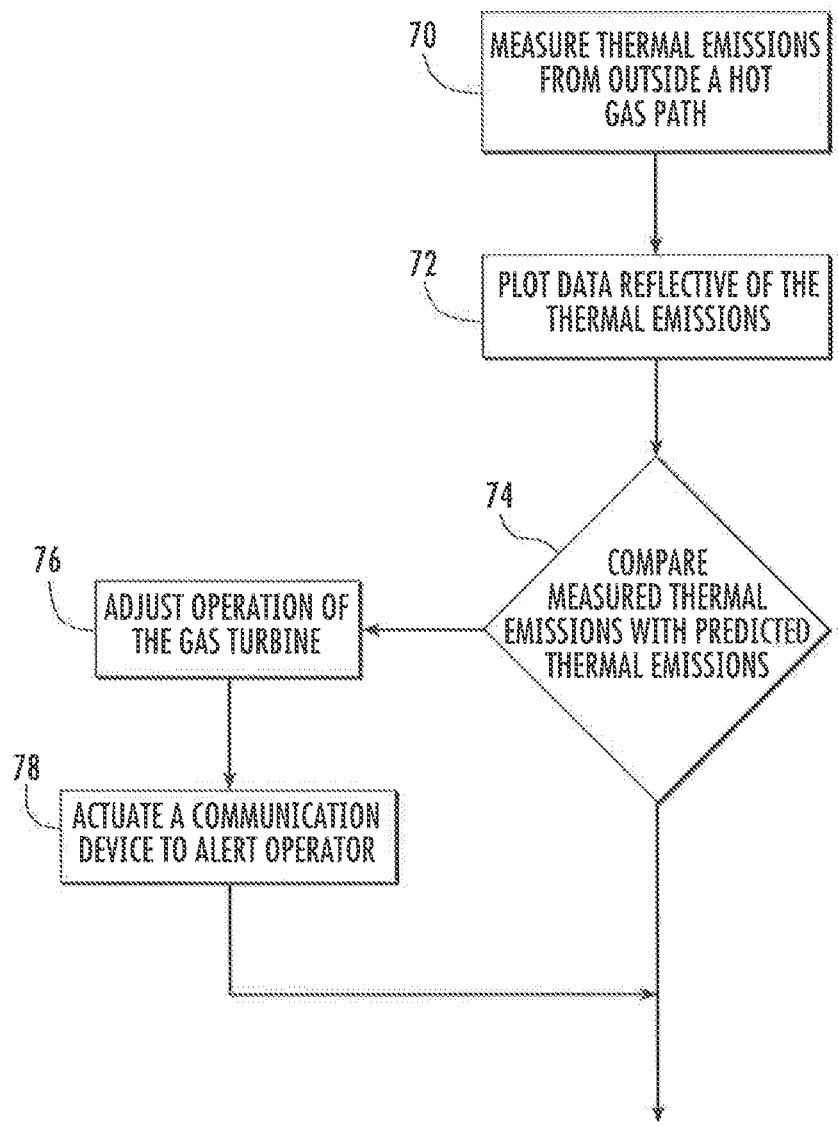
FIG. 5 is a block diagram of an algorithm for the controller according to one embodiment of the present invention.

The embodiments previously shown and described with respect to FIGS. 1 through 4 may be used to provide a method for operating a gas turbine. For example, the method may include detecting, measuring, and/or monitoring thermal emissions from inside and/or outside the hot gas path, represented by the box labeled 70 in FIG. 5. The sensor 54 used to detect, measure, and/or monitor the thermal emissions may produce one or more signals 60 reflective of the thermal emissions. The method may then plot the data reflective of the thermal emissions, represented by the box labeled 72 in FIG. 5. For example, software commonly available and sold by National Instruments under the trade name LabVIEW may be used to assimilate the collected data and prepare real-time plots showing the location and magnitude of thermal emissions inside and/or outside the hot gas path. At box 74 in FIG. 5, the method may compare the measured thermal emissions with predicted thermal emissions for the component at a given time in life and operating history. Based on this comparison, the controller 56 may adjust the operation of the compressor 14, combustor 16, and/or turbine 18 to achieve a desired thermal emission or temperature profile, as previously discussed. In addition, or alternatively, the controller 56 may adjust the interval between scheduled corrective and/or preventive maintenance. As represented by the box labeled 78 in FIG. 5, the controller 56 may also actuate the communications device 58 to notify the operator of the measured thermal emissions.

The system 10 and methods for operating the gas turbine 12 as previously described should provide several technical and commercial advantages over existing technology without requiring penetration of the combustor 16, turbine, and/or hot gas path. For example, the early detection of an abnormal condition and/or improved monitoring, tracking, and plotting of thermal emissions inside and outside of the hot gas path should improve the reliability and efficiency of the gas turbine 12, extend the life of previously consumable components, and reduce undesirable emissions associated with elevated combustion temperatures. In addition, temperature profiles of the nozzles 42 and combustors 16 may be more closely monitored during transient operations, such as start up operations, thereby further improving the reliability and performance of the gas turbine 12. Lastly, these improvements may be achieved through the use of relatively inexpensive infrared and ultraviolet sensors that do not have to be able to withstand the harsh environments of the combustors, turbine, and hot gas path.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operating a gas turbine, comprising:
   a. a compressor;
   b. a combustor downstream of the compressor, the combustor having a liner and a transition piece defining a hot gas through the combustor;
   c. a turbine downstream of the combustor, wherein the turbine further defines the hot gas path;

d. a sensor disposed entirely outside the hot gas path, wherein the sensor is pointed at and in direct sight with an outer surface of a flow sleeve surrounding at least one of the liner and the transition piece, and wherein the sensor measures external thermal emissions of said outer surface of the at least one of the liner and the transition piece, and generates a signal reflective of the external thermal emissions, wherein the external thermal emissions comprise at least one of infrared or ultraviolet emissions; and e. a controller connected to the sensor to receive the signal, wherein the controller adjusts at least one of the compressor, combustor, or turbine in response to the signal from the sensor.

2. The system as in claim 1, wherein the compressor includes an inlet guide vane having an adjustable position, and the controller adjusts the adjustable position of the inlet guide vane in response to the signal from the sensor.

3. The system as in claim 1, wherein the combustor includes a variable fuel supply, and the controller adjusts the variable fuel supply in response to the signal from the sensor.

4. The system as in claim 1, further including an access port between the sensor and the external thermal emissions.

5. The system as in claim 1, further including a communications device connected to the controller, wherein the controller actuates the communications device in response to the signal from the sensor.

6. A system for operating a gas turbine, comprising:
   a. a compressor;
   b. a combustor downstream of the compressor, the combustor having at least one of a liner and a transition piece defining a hot gas path through the combustor;
   c.
   d. a sensor disposed entirely outside the hot gas path, wherein the sensor is pointed at and in direct sight with an outer surface of a flow sleeve surrounding at least one of the liner and the transition piece, and pointed at an outer wall portion of at least one of the liner and the transition piece, wherein the sensor measures;
      i.
      ii. external thermal emissions from said outer surface and generates a signal reflective of the external thermal emissions;
      iii. wherein the external thermal emissions comprise at least one of infrared or ultraviolet emissions; and
   e. a controller connected to the sensor to receive the signal, wherein the controller adjusts at least one of the compressor, combustor, or turbine in response to the signal from the sensor.

7. The system as in claim 6, wherein the compressor includes an inlet guide vane having an adjustable position, and the controller adjusts the adjustable position of the inlet guide vane in response to the signal from the sensor.

8. The system as in claim 6, wherein the combustor includes a variable fuel supply, and the controller adjusts the variable feel supply in response to the signal from the sensor.

9. The system as in claim 6, further including an access port between the sensor and the external emissions.

10. The system as in claim 6, further including a communications device connected to the controller, wherein the controller actuates the communications device in response to the signal from the sensor.

11. A method for operating a gas turbine having a compressor, a combustor, and a turbine, wherein the combustor includes at least one of a liner and a transition piece defining a hot gas path through the combustor, and wherein the turbine further defines the hot gas path, the method comprising:
   a. measuring external thermal emissions from an outer surface of a flow sleeve surrounding at least one of the liner and the transition piece using a sensor disposed entirely outside of the hot gas path, wherein the sensor is pointed at and in direct sight with said outer surface, and wherein the external thermal emissions comprise at least a one of infrared or ultraviolet emissions;
   b. generating a signal reflective of the external thermal emissions;
   c. adjusting the operation of at least one of the compressor, combustor, or turbine in response to the signal from the sensor.

12. The method as in claim 11, further comprising adjusting an inlet guide vane in the compressor in response to the signal from the sensor.

13. The method as in claim 11, further comprising adjusting a variable fuel supply to the combustor in response to the signal from the sensor.

14. The method as in claim 11, further comprising measuring the external thermal emissions through an access port between the sensor and the external emissions.

15. The method as in claim 11, further comprising actuating a communications device in response to the signal from the sensor.

* * * * *